(12) United States Patent
Li (10) Patent No.: US 8,090,216 B2
(45) Date of Patent: Jan. 3, 2012

(54) IMAGE NOISE LEVEL ESTIMATION FROM JPEG DATA

(75) Inventor: Dong Li, Cupertino, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 931 days.

(21) Appl. No.: 12/103,800

(22) Filed: Apr. 16, 2008

(65) Prior Publication Data

US 2009/0263035 A1    Oct. 22, 2009

(51) Int. Cl.
G06K 9/00    (2006.01)

(52) U.S. Cl. ...................................................... 382/275

(58) Field of Classification Search .......... 382/274–275, 382/232–251; 375/240.01–240.29
See application file for complete search history.

(56) References Cited

U.S. PATENT DOCUMENTS

| | | | |
|---|---|---|---|
| 5,729,631 | A | 3/1998 | Wober et al. |
| 5,790,717 | A * | 8/1998 | Judd .............................. 382/323 |
| 5,887,084 | A | 3/1999 | Wober et al. |
| 6,810,083 | B2 * | 10/2004 | Chen et al. ............... 375/240.25 |
| 6,972,868 | B1 | 12/2005 | Gondek et al. |
| 7,262,719 | B2 | 8/2007 | Rijavec |
| 2002/0150302 | A1 | 10/2002 | McCarthy et al. |
| 2003/0086623 | A1 | 5/2003 | Berkner et al. |
| 2003/0112333 | A1 | 6/2003 | Chen et al. |
| 2003/0219070 | A1 | 11/2003 | Turaga et al. |
| 2006/0034531 | A1 | 2/2006 | Poon et al. |
| 2006/0245506 | A1 | 11/2006 | Lin et al. |
| 2007/0025447 | A1 | 2/2007 | Kojokaro et al. |
| 2007/0109430 | A1 | 5/2007 | Staelin et al. |
| 2007/0160304 | A1 | 7/2007 | Berkner et al. |
| 2007/0217705 | A1 | 9/2007 | Lee et al. |
| 2007/0223839 | A1 | 9/2007 | Kisilev et al. |
| 2007/0280552 | A1 | 12/2007 | Lee et al. |
| 2008/0013847 | A1 | 1/2008 | Li |
| 2008/0044097 | A1 | 2/2008 | Krishnan et al. |

FOREIGN PATENT DOCUMENTS

JP    11032333    2/1999

(Continued)

OTHER PUBLICATIONS

S. Comes et al., "Postprocessing of Images by Filtering the Unmasked Coding Noise", IEEE Transactions on Image Processing, vol. 8, No. 8, Aug. 1999, pp. 1050-1062.

(Continued)

*Primary Examiner* — Ishrat I Sherali
(74) *Attorney, Agent, or Firm* — RatnerPrestia (57) ABSTRACT

A system for estimating noise levels in a data stream includes a calculator for determining DC and AC values of DCT coefficients in coded data blocks, where the coded data blocks are within a strip of an image divided into multiple strips. A classifier is included for forming a plurality of luminance levels, based on the calculated DC values. A selector is included for selecting coded data blocks having minimum AC values, as computed by the calculator. At least two coded data blocks are selected for each of the luminance levels. After decoding, another calculator is used for determining a variance for each of the decoded data blocks corresponding to the selected coded data blocks in each strip. An order statistic filter is included for ordering the decoded data blocks in each strip based on the calculated variances. Another selector selects one of the decoded data blocks, for each of the luminance levels.

20 Claims, 7 Drawing Sheets

FOREIGN PATENT DOCUMENTS

| | | |
|---|---|---|
| JP | 2005012678 | 1/2005 |
| JP | 2007028489 | 2/2007 |

OTHER PUBLICATIONS

E. Cohen et al., "Blind image quality assessment considering blur, noise, and JPEG compression distortions", Proc. of SPIE, vol. 6696, 2007.

A. Bosco et al., "Fast Method for Noise Level Estimation and Integrated Noise Reduction", IEEE Transactions on Consumer Electronics, vol. 51, No. 3, Aug. 2005, pp. 1028-1033.

G. Luo, "Image Noise Analysis with a Fast Lifting Wavelet Algorithm for Objective Image Quality Evaluation", Proceedings of the Third International Conference on Image and Graphics, 2004.

R. A. Gopinath et al., "Wavelet-Based Post-Processing of Low Bit Rate Transform Coded Images", IEEE, 1994, pp. 913-917.

F. J. Garcia et al., Compression Standards: JPEG, H.261 & MPEG, Chapter 3 of the Open Information Interchange (OII) Technical Handbook, Technology Appraisals, 1996.

Z. Long et al., "Adaptive Deblocking of Images with DCT Compression", of Mississippi State University.

\* cited by examiner

IMAGE NOISE LEVEL ESTIMATION FROM JPEG DATA

FIELD OF THE INVENTION

The present invention relates, in general, to image processing of JPEG (Joint Photographic Experts Group) formatted data. More specifically, the present invention relates to systems and methods for estimating noise levels in JPEG images.

BACKGROUND OF THE INVENTION

Many compression algorithms are known. One such compression algorithm is the JPEG standard. The JPEG (Joint Photographic Experts Group) is the name of a committee and the name of the international standard adopted by that committee which applies to compression of graphic images (pictures). The JPEG standard is one of the most popular and comprehensive continuous tone, still frame compression standards. JPEG defines a lossy baseline coding system, which is based on the Discrete Cosine Transform (DCT).

Lossy image compression refers to a technique wherein the compressed data cannot be decompressed into an exact copy of the original image, i.e., there is a loss of quality of the final image. An important goal in lossy image compression is to achieve maximum compression while still obtaining high image quality of the decompressed image. Too great of a compression amount often introduces unacceptable artifacts into the decompressed image.

In the JPEG lossy baseline system, compression is performed by first dividing the image into non-overlapping blocks of size 8 by 8 pixels, which are processed in an order from left to right, top to bottom. After a normalization step, a two-dimensional DCT is applied to each block. This transform, similar to a Fourier transform, produces a transformed block (matrix) in the frequency domain. The first coefficient (location 0, 0) in the transformed block is a constant that represents the average or DC component of the 64 image elements (pixels) included in each image block. The remaining coefficients, which represent AC components of the 64 image elements, describe higher frequencies found in the block.

The DCT coefficients are then quantized using a defined quantization table and reordered using a zigzag pattern to form a one-dimensional sequence of quantized coefficients. Lossless entropy coding, such as Huffman coding, may then be applied to the resulting sequence to produce the compressed data.

Although there are a number of settings that may be predefined to achieve different compression ratios, one parameter, called the quality factor, may be adjusted in JPEG compression. The quality factor is a single number in an arbitrary, relative scale and is often adjusted on an image-by-image basis. A higher quality factor provides a relatively high quality decompressed image, but requires a relatively large file (less compression). A lower quality factor provides greater compression with a correspondingly smaller file size. There may be more visible defects or artifacts, however, in the decompressed image.

In many image processing application programs, such as image noise removal, image segmentation, etc., accurate knowledge of the noise level present in the image is of crucial importance for tuning the parameters of the corresponding algorithms. When applying a post processing algorithm, or after market software, to enhance the output images from digital cameras, the noise present in the images may significantly impact the effectiveness of the image processing. Precise information about the noise present in these images may be used, however, for improving the performance of these algorithms, by tuning the parameters of the algorithms to the noise level.

In today's digital images, the type and level of the noise generated by a digital camera depends on the series and brand of the camera, as well as the camera settings (ISO, shutter speed, aperture and flash on/off). The noise level also varies based on the pixel brightness level, as pixels exposed to more light generally have less noise. In addition, the noise level varies depending on the pixel location, as pixels located on a boundary are exposed to less light than pixels located in the central of the image area due to the limitation of an optical lens. The noise level, therefore, is not uniformly distributed in digital images, while most image processing algorithms assume a uniformly distributed noise level.

As will be explained, the present invention provides a system and method for estimating noise levels in JPEG images, so that after market software may improve performance of post processing of JPEG image data.

DETAILED DESCRIPTION OF THE INVENTION

In image processing applications, such as image noise removal and image segmentation, accurate knowledge of the noise level present in the image is of crucial importance for tuning the parameters of corresponding image processing algorithms. The noise level varies depending on the pixel brightness level and the pixel location. The noise level is, thus, not uniformly distributed in a digital image. The present invention assumes that the noise level present in an image is not uniformly distributed and, accordingly, determines the noise levels of the image at different locations across the image plane.

As will be explained, the present invention estimates noise levels in JPEG formatted image data and uses DCT coefficients from a JPEG stream to locate flat blocks having different luminance levels. The noise level (noise variance) is estimated from these flat blocks. The results of the present invention may be used by any post-processing algorithms, or after market software, where accurate noise level estimation is required. It will be understood that the present invention may also be used for estimating noise levels in an MPEG (Moving Picture Expert Group) data stream.

Figure 1:
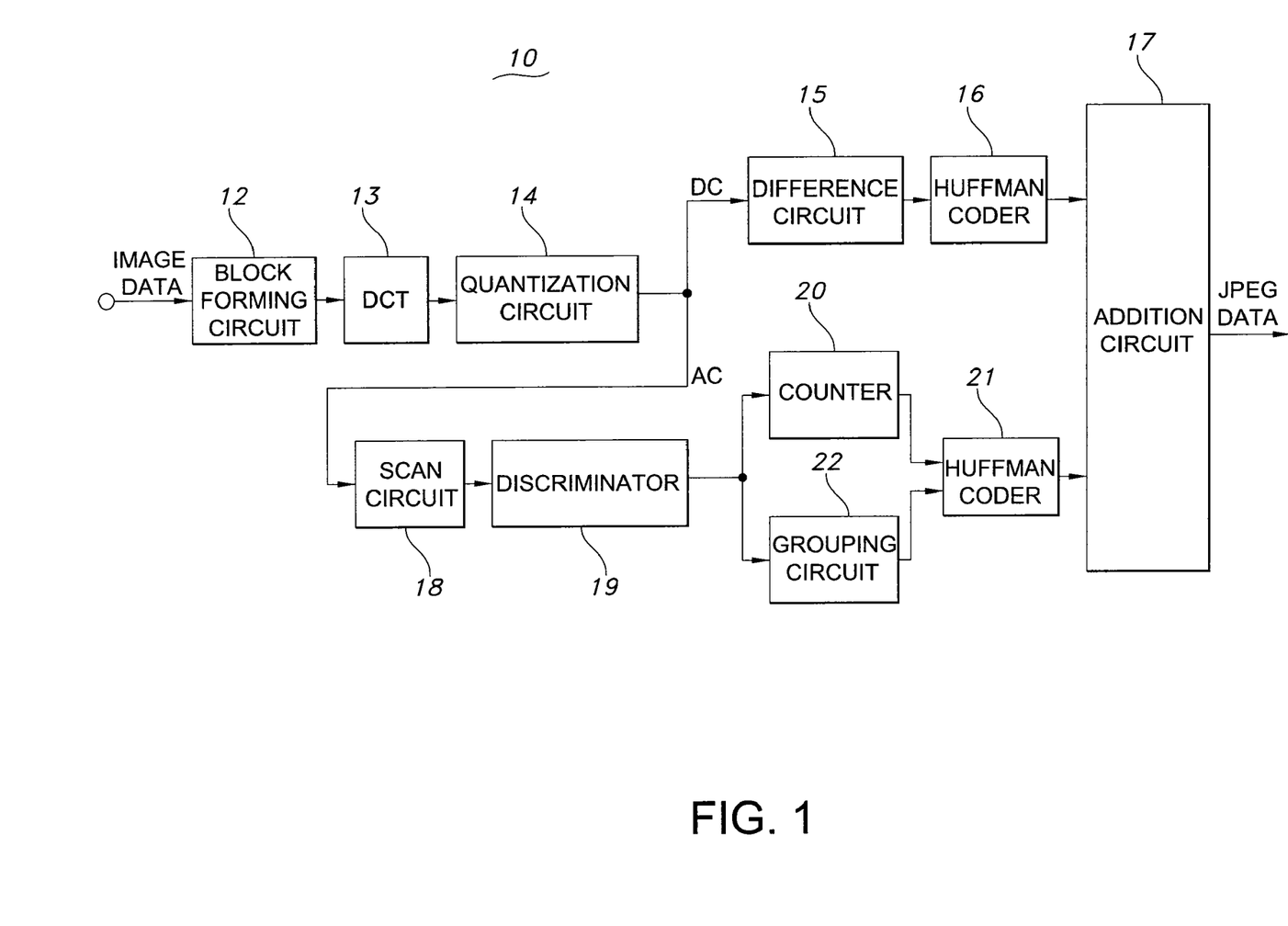
FIG. 1 is an exemplary JPEG coding system.

Referring first to FIG. 1, there is shown a system for coding a JPEG image. As shown, input image data is divided into blocks, each consisting of 8×8 pixels, by block forming circuit 12. Each of these blocks is subjected to two-dimensional DCT (discrete cosine transform) calculation by DCT circuit 13 to be converted into a spatial frequency component (DCT coefficient) consisting of one DC component (DC) and 63 AC components (AC). A quantization circuit 14 quantizes the obtained frequency components by dividing them with pre-determined quantization coefficients. The quantized frequency components are separated into DC and AC components and coded by different algorithms. Different quantization coefficients may normally be used in units of frequency components. For example, a quantization coefficient for a low-frequency component, which is visually important, may be set to a smaller value than one for a high-frequency component. With such quantization, high-frequency components which have low visual importance may be cut, and the data size may thus be reduced.

Each of the separated DC components is inputted to difference circuit 15 and converted into a difference from the DC component of the immediately preceding block by utilizing high correlation with adjacent blocks. The obtained differences are inputted to Huffman coder 16 and subjected to one-dimensional Huffman coding, thereby obtaining coded data of the DC components.

On the other hand, the AC components are inputted to scan circuit 18. The 63 AC components are sequentially zigzag-scanned in the order from low-frequency components which are visually important to obtain a one-dimensional array. The one-dimensional array of AC components is inputted to discriminator 19 and discriminated between a value of each component being zero or being a value other than zero. A counter 20 counts the run length of zeros, and grouping circuit 22 groups the coefficients using their values. A combination of the run length and the group values is inputted to Huffman coder 21 and subjected to two-dimensional Huffman coding, thus obtaining coded data of the AC components. The AC coded data and the DC coded data are combined in addition circuit 17 to form JPEG coded data. With the addition of marker codes and the like, JPEG data shown in FIG. 3 is obtained.

Figure 3:
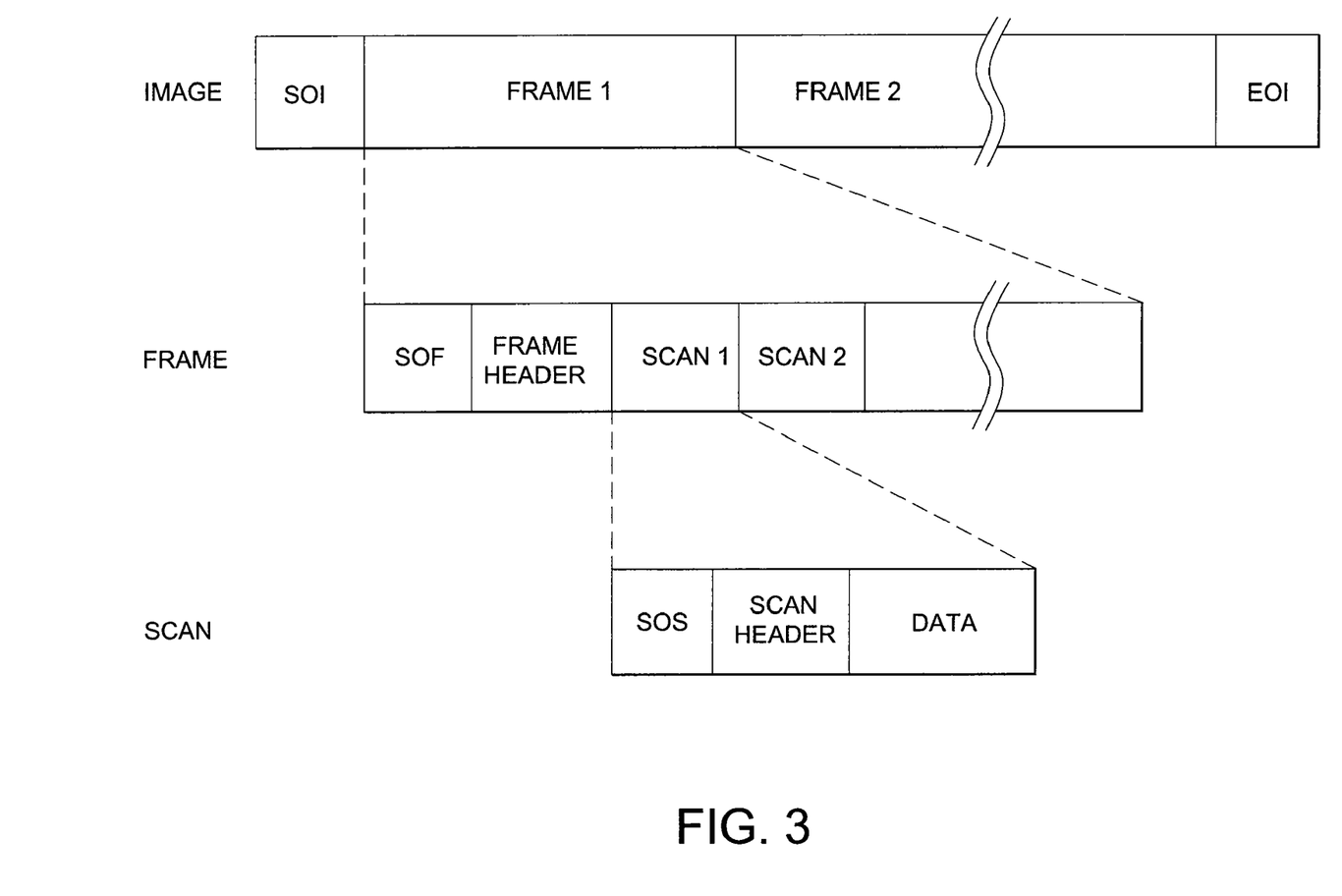
FIG. 3 illustrates an image scan structure including coded data and various marker codes.

Referring next to FIG. 3, coded data and various marker codes constitute an image/frame/scan hierarchical structure. More specifically, the JPEG data is constituted by an SOI (Start Of Image) code, a frame, and an EOI (End Of Image) code. In the case of hierarchically coded data, the frame includes a plurality of frames in units of layers; otherwise, the frame consists of a single frame. Furthermore, the frame is constituted by an SOF (Start Of Frame) code, a frame header, and scans; and each scan is constituted by an SOS (Start of Scan) code, a scan header and coded data.

Each scan shown in FIG. 3 includes a plurality of scans when luminance data (Y) and two color difference data (Cr, Cb) are separately coded (non-interleave), or consists of a single scan when data is coded without separating data (interleave).

Figure 4:
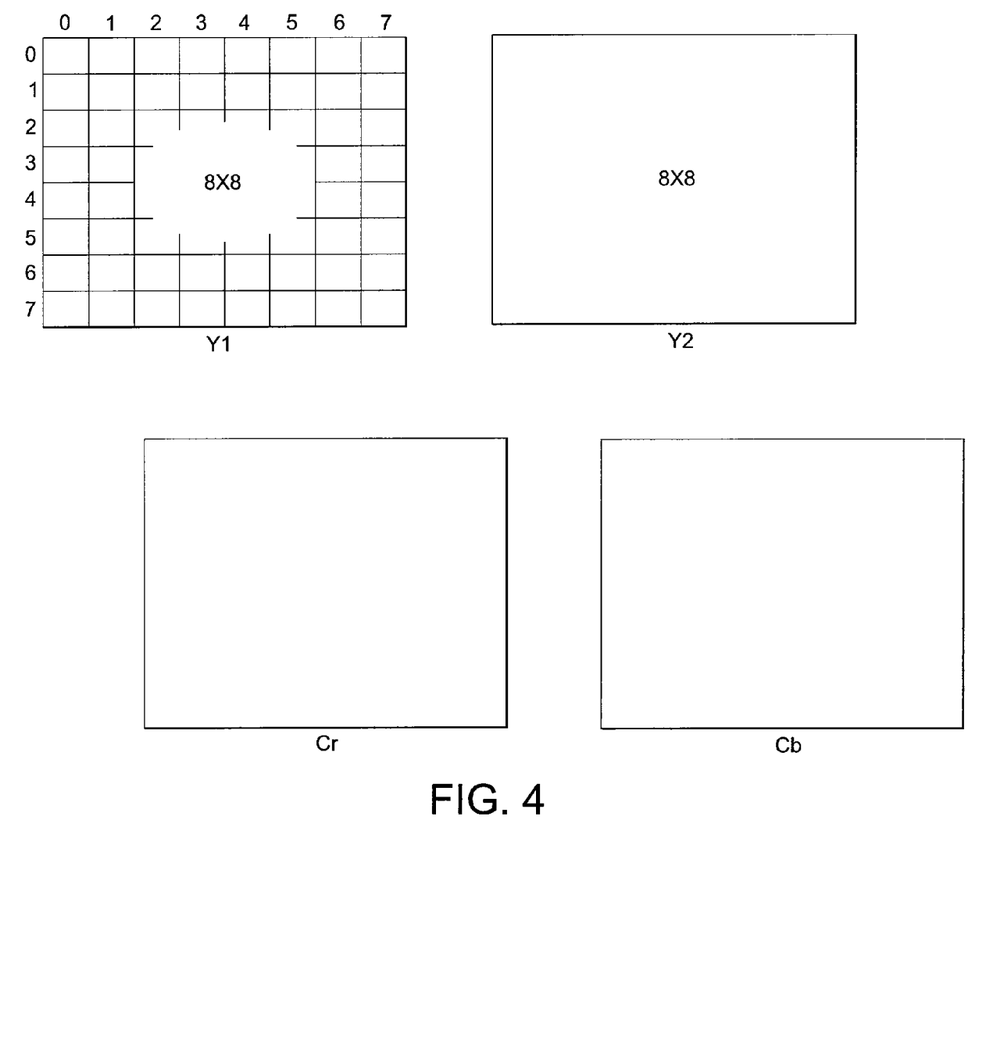
FIG. 4 illustrates a minimum coded unit (MCU) in a 4:2:2 JPEG stream, including two Y blocks (Y1 and Y2), one Cr block, and one Cb block.

As defined by the present invention, a minimum coded unit (MCU) for a 4:2:2 JPEG stream includes two Y blocks (shown as Y1 and Y2 in FIG. 4), one Cb block and one Cr block (shown, respectively, as Cb and Cr in FIG. 4). It will be appreciated, however, that there are different JPEG streams. The two Y blocks (Y1 and Y2) shown in FIG. 4 assume a 4:2:2 JPEG stream (4Y:2Cr:2Cb). Other JPEG streams, for example, include 4:4:4, 4:2:0 and 4:1:1 JPEG streams. The present invention may be extended to include these other JPEG streams.

Figure 2:
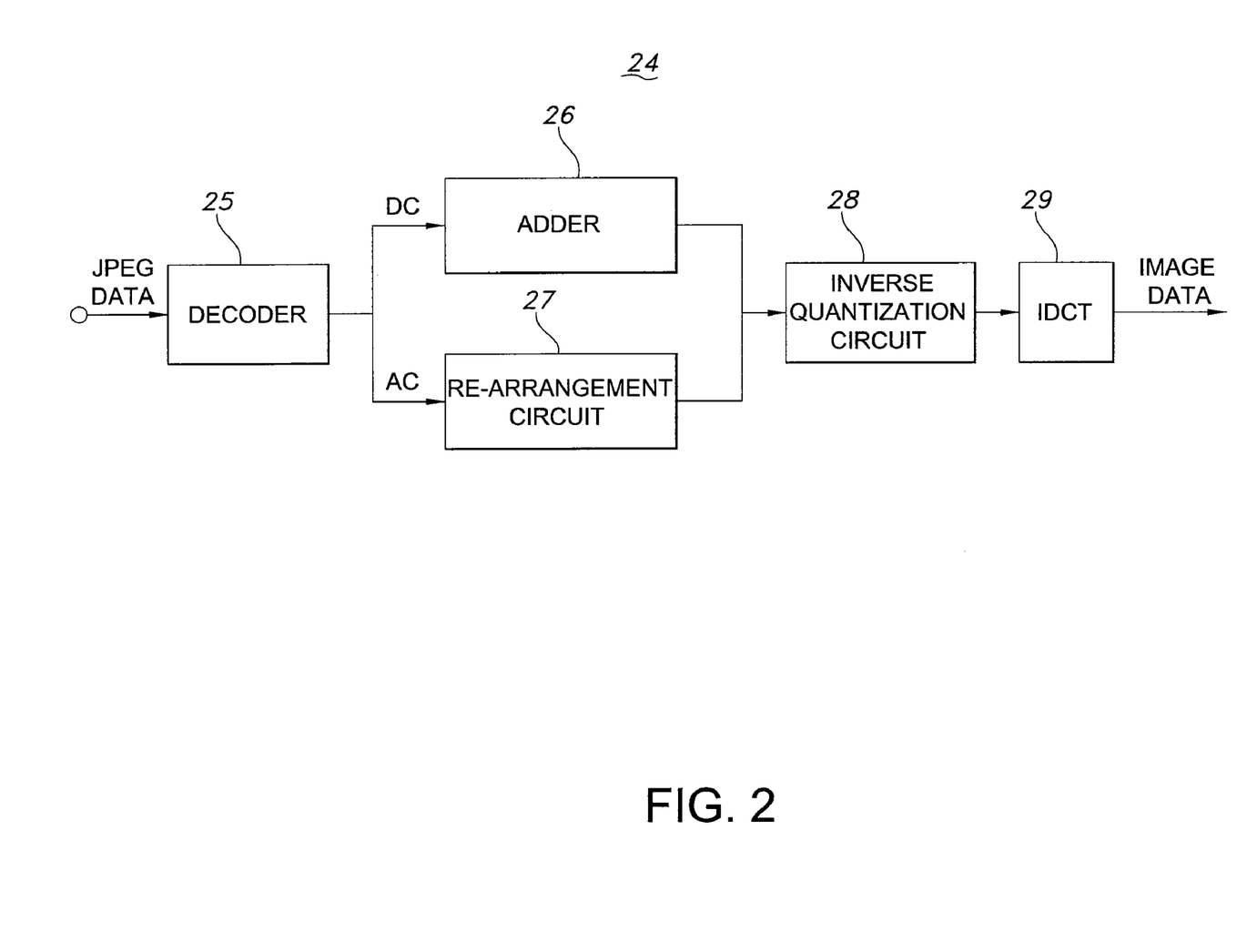
FIG. 2 is an exemplary JPEG decoding system.

A JPEG decoding system is shown in FIG. 2. As shown, input JPEG data is decoded by decoder 25 on the basis of a Huffman table added to the JPEG data. The decoded DC component is added to the immediately preceding block by adder 26, and the decoded AC components are re-arranged by re-arrangement circuit 27 to be restored to an original two-dimensional array. Thereafter, the respective frequency components are de-quantized by inverse quantization circuit 28, on the basis of a quantization coefficient table added to the JPEG data and subjected to an inverse DCT in IDCT circuit 29. In this manner, the JPEG data is restored to image data (decoded data).

The above described systems are basic in the JPEG method. It will be appreciated, however, that extended systems adopting various kinds of hierarchical coding have also been approved and are applicable for use by the present invention in estimating noise levels in a JPEG image, or images.

Figure 5:
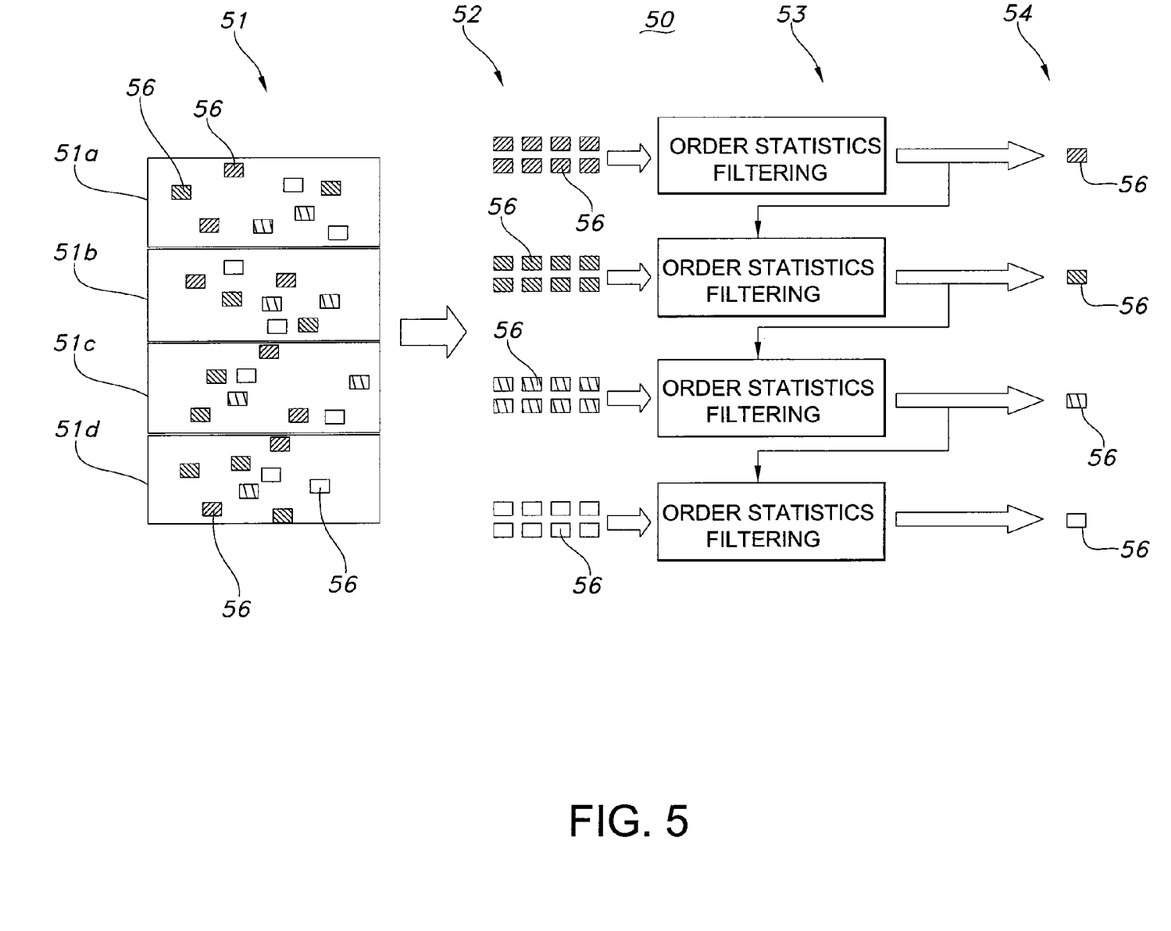
FIG. 5 is a functional block diagram depicting a method for estimating image noise levels and their respective locations in a JPEG image, in accordance with an embodiment of the present invention.

Referring next to FIG. 5, there is shown an embodiment of the present invention, generally designated as method 50. As shown, method 50 includes input image 51 which is divided into four strips (as an example). Each strip 51a to 51d includes eight (for example) selected MCU blocks 56, each MCU block 56 includes at least two luminance blocks, Y1 and Y2, and two color difference blocks, Cr and Cb. It will be appreciated that in a 4:4:4 format, however each MCU block 56 includes only one Y block. In the exemplified embodiment, for each strip, there are two (for example) MCU blocks for each different luminance level. As shown, for each strip, there are two MCU blocks for each of four (for example) different luminance levels. Thus, there are, as shown, 32 MCU block locations for the four exemplified strips.

Next in the method, as will be explained, the 32 (for example) MCU blocks are rearranged to fit within the four (for example) different luminance levels, designated by 52. Thus, each of the four luminance levels 52 includes eight MCU blocks 56.

Next, as will also be explained, the 32 (for example) MCU blocks are ordered by way of a constrained order statistics filter, shown designated as 53. The ordering is based on the variance values of each of the 32 MCU blocks. Finally, the method selects one (for example) MCU block for each of the four luminance levels. The four selected MCU blocks are shown designated as 54.

Figure 6:
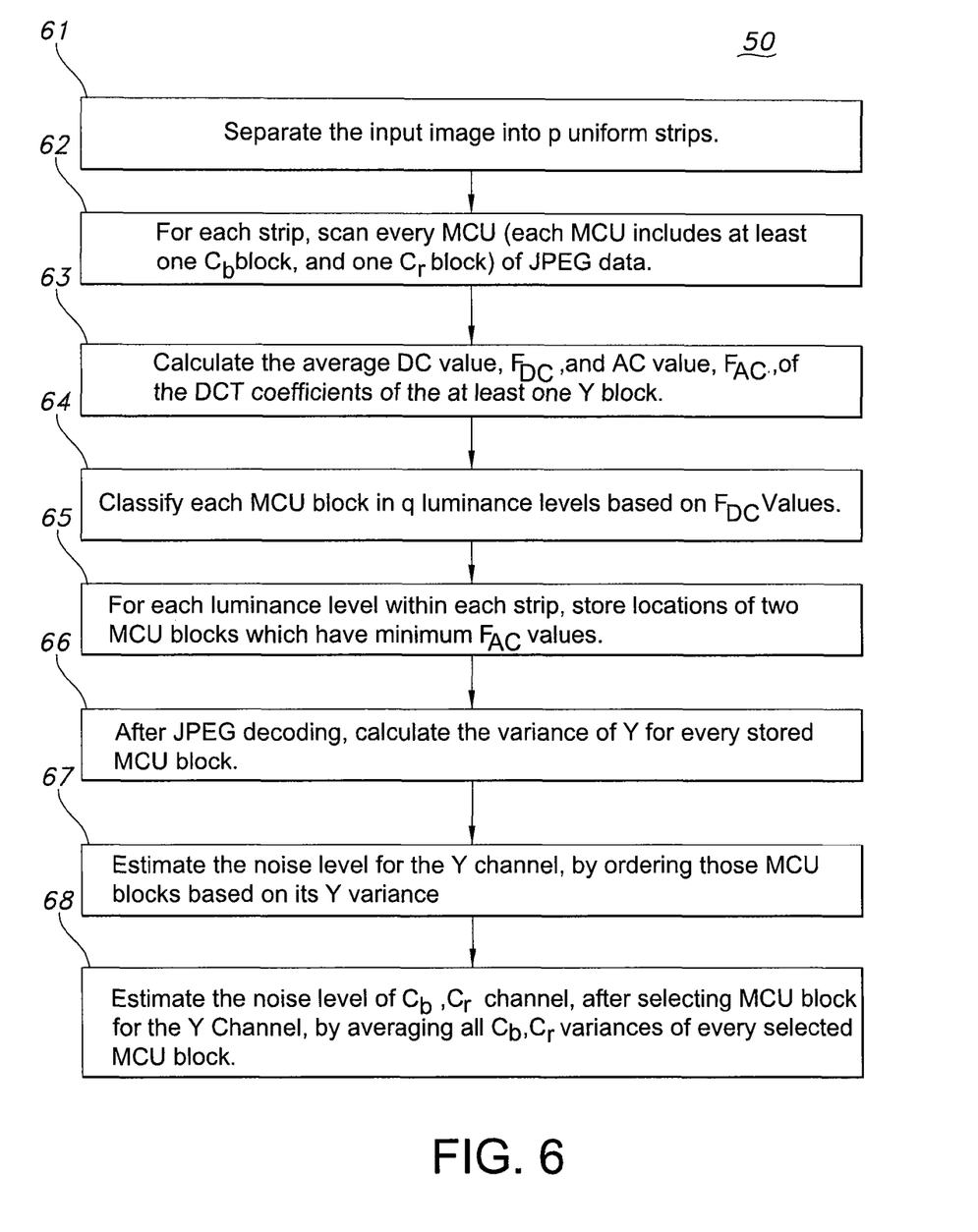
FIG. 6 is a flow diagram depicting a method for estimating noise levels in a JPEG image stream, in accordance with an embodiment of the present invention.

Method 50 will now be explained in detail by referring to FIGS. 5 and 6. Given a JPEG image, the processing steps of method 50 for noise level estimation is described as follows:

(Step 61) Separate the input image 51 into p uniform strips (p=4 as an example in FIG. 5).

(Step 62) For each strip, scan every MCU (For a 4:2:2 JPEG stream, for example, each MCU includes two Y blocks, one $C_b$ block, and one $C_r$ block) of JPEG data.

(Step 63) Calculate the average DC value $F_{DC}$ and average AC value $F_{AC}$ for every MCU block. The calculation is performed as follows for a 4:2:2 JPEG stream:

$$F_{DC} = (d_{Y1}(0, 0) + d_{Y2}(0, 0))/2$$

$$F_{AC} = \sum_{i=0}^{7}\sum_{j=0}^{7}(|d_{Y1}(i, j)| + |d_{Y2}(i, j)|) - 2(|d_{Y1}(0, 0)| + |d_{Y2}(0, 0)|)/2$$

where d(i, j) is the DCT coefficients of a Y block shown in FIG. 4.

(Step 64) Classify each MCU block into q luminance levels based on the calculated $F_{DC}$ values. Accordingly, if q=4, for example, the following classification may be used:

Luminance Level 1: if ($F_{DC}$>−1000 && $F_{DC}$≦−700)
Luminance Level 2: if ($F_{DC}$>−700 && $F_{DC}$≦−250)

Luminance Level 3: if ($F_{DC}>-250$ && $F_{DC}\leqq 200$)
Luminance Level 4: if ($F_{DC}>200$ && $F_{DC}\leqq 700$)

It will be appreciated that for $F_{DC}\leqq -1000$ or for $F_{DC}>700$, the image pixel value is more likely to be cropped. Therefore, such luminance value is not considered as a candidate block for noise estimation.

(Step 65) For each luminance level within each strip, store locations of two (for example) MCU blocks which have minimum $F_{AC}$ values. For q=4, for example, a maximum of 8 MCU block locations are stored for each strip, and a maximum of 32 MCU block locations are stored for the whole image (image 51 in FIG. 5).

(Step 66) After JPEG decoding, calculate the variance of Y for every stored MCU block. The variance of Y may be calculated as follows for a 4:2:2 JPEG stream:

$$\sigma^2_{MCU} = \left( \sum_{i=0}^{7}\sum_{j=0}^{7}(Y_{Y1}(i,j)-Mean_{Y1Y2})^2 + \sum_{i=0}^{7}\sum_{j=0}^{7}(Y_{Y2}(i,j)-Mean_{Y1Y2})^2 \right) / 128$$

where $Y_{Y1}(i,j)$ and $Y_{Y2}(i,j)$ are decoded Y coefficients for the Y1 and Y2 blocks, and
$Mean_{Y1Y2}$ is the mean Y value of the Y1 and Y2 blocks, and may be defined as follows:

$$Mean_{Y1Y2} = \left( \sum_{i=0}^{7}\sum_{j=0}^{7}(Y_{Y1}(i,j)+Y_2(i,j)) \right) / 128$$

It will be appreciated the denominator of 128 is the total of 64 Y1 and 64 Y2 pixels.

(Step 67) Next the noise level for the Y Channel is estimated as follows:

For the stored MCU blocks in each luminance level L ($1\leqq L\leqq q$), order the stored MCU blocks based on each MCU block's Y variance of $\sigma^2_{MCU(L)(i)}$
where ($1\leqq i\leqq N$, N is the total valid MCU blocks within each luminance level).
Assume this order is given by $$\sigma^2_{MCU(L)(1)} \leqq \sigma^2_{MCU(L)(2)} \leqq \ldots \leqq \sigma^2_{MCU(L)(N-1)} \leqq \sigma^2_{MCU(L)(N)}.$$

In general, pixels exposed to less light have more noise. Therefore, the noise existing in luminance level L is likely higher than the noise existing in luminance level L+1. Therefore, the present invention uses noise estimation of in a lower luminance level as guidance to form a constrained order statistic filter (as shown in FIG. 5 by element 53).

The noise variance $\sigma^2_{Y(L)}$ for a luminance level L may be estimated from an MCU block that satisfies the following criteria:

$$\sigma^2_{Y(L)} = \begin{cases} \sigma^2_{MCU(L)((N+1)/2)}, & \text{if}(\sigma^2_{MCU(L)((N+1)/2)} < \sigma^2_{Y(L-1)}+\delta) \\ \sigma^2_{MCU(L)(i)}, & \text{else if} \begin{pmatrix} \sigma^2_{MCU(L)(i)} < \sigma^2_{Y(L-1)}+\delta \\ \text{and} \\ \sigma^2_{MCU(L)(i+1)} \geqq \sigma^2_{Y(L-1)}+\delta \end{pmatrix} \\ \sigma^2_{MCU(L)(1)}, & \text{else} \end{cases}$$

where $\delta$ is a threshold value.

Thus, one MCU block may be selected for each luminance level, as shown by element 54 in FIG. 5. The mean Y value of each selected MCU block 56 is saved in memory for use by after market software.

If desired by the user, a more accurate noise estimation of the Y channel may be obtained. This step, however, may be omitted. If desired, after selecting the noise blocks for the Y channel, the user may select a larger window size (for example a 128×128 pixel array), and again calculate the variance.

(Step 68) Noise estimation of the $C_b$, $C_r$ channel may be determined as follows: After selecting the MCU blocks for the Y Channel in step 67, the noise variance estimation of the $C_b$, $C_r$ channel is simply the average of all $C_b$, $C_r$ variances of every selected MCU block.

The above process steps provide q noise level estimations corresponding to the different luminance levels (or mean Y values). It will be appreciated, however, that an interpolation step may be used when image processing algorithms require the noise level for every luminance level (continuous noise level estimation).

Figure 7:
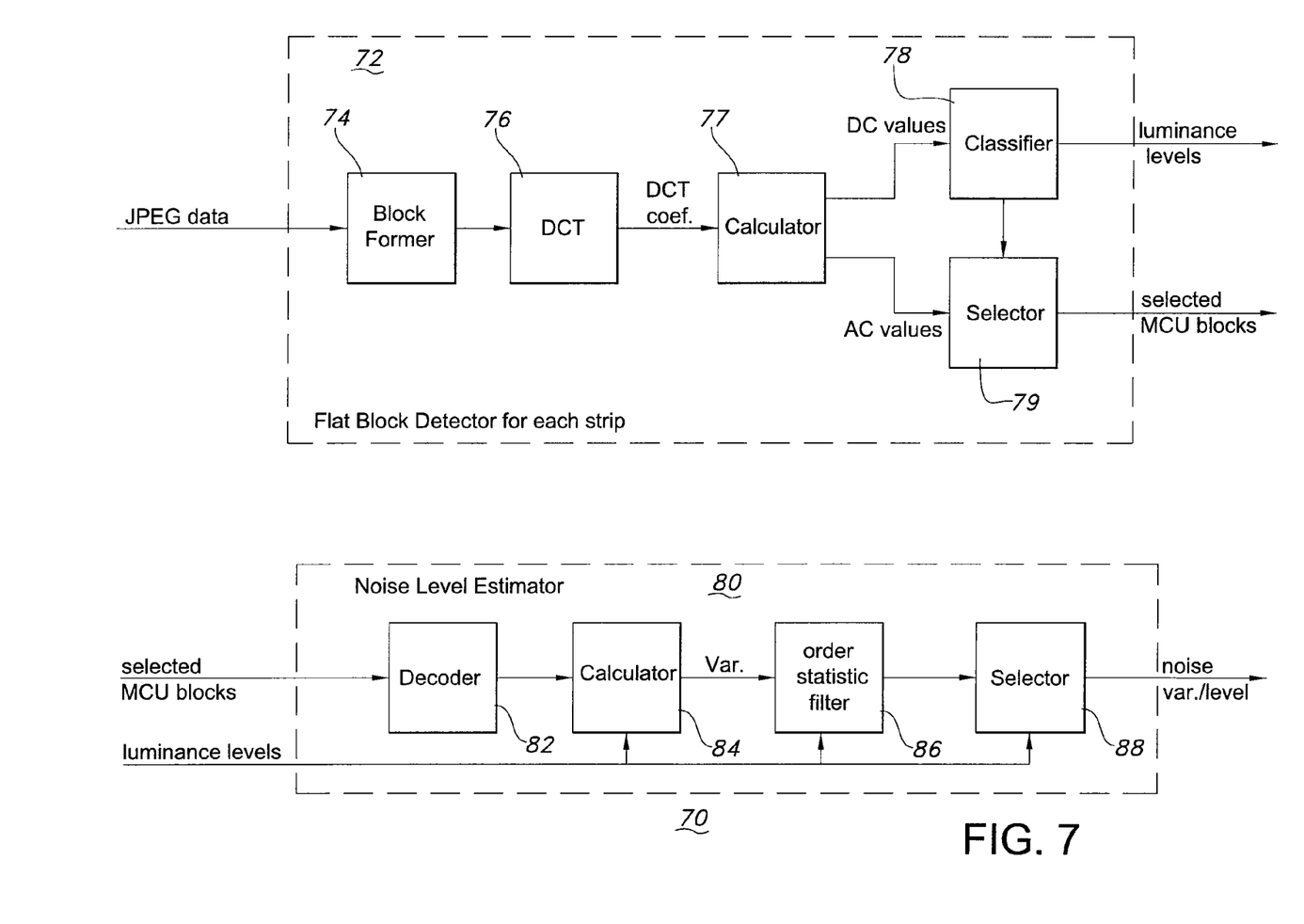
FIG. 7 is a functional block diagram depicting a system for determining noise levels of a JPEG image, in accordance with an embodiment of the present invention.

Referring next to FIG. 7, there is shown a functional block diagram of a system for estimating noise level in an image, the system designated as 70. As shown, JPEG data is received by flat block detector 72, which selects flat blocks with different luminance levels. Noise level estimator 80 receives the selected flat blocks and the luminance levels and estimates the noise for the different luminance levels.

Referring first to flat block detector 72, block former 74 outputs MCU blocks, each including, for example, two Y blocks and one $C_b$ block and one $C_r$ block for a 4:2:2 JPEG stream. DCT former 76 receives the MCU blocks and provides DCT coefficients for each MCU block. Calculator 77 receives the DCT coefficients and calculates average DC values and AC values of these DCT coefficients located in the Y blocks. Classifier 78 receives the DC values from calculator 77 and provides a set of luminance levels for the image. Selector 79 receives the AC values from calculator 77 and selects two minimum values of the AC values. The data blocks corresponding to the two minimum AC values are stored in memory.

Referring next to noise level estimator 80, decoder 82 decodes the selected MCU blocks to provide image data to calculator 84. The calculator 84 receives the decoded data blocks corresponding to the selected coded data blocks and determines a variance (var) for each one of these blocks. This is done for each luminance level. Order statistic filter 86 receives the calculated variances from calculator 84 and orders the variances for final selection by selector 88. Selector 88 selects a single noise variance for every luminance level.

It will be appreciated that FIG. 7 may be arranged differently. For example, the calculator, selector and classifier may be software modules executed by a single processor. Similarly, the order statistic filter may also be a software module executed by a processor. The partitions shown in FIG. 7 are for explanation purposes only.

Although the invention is illustrated and described herein with reference to specific embodiments, the invention is not intended to be limited to the details shown. Rather, various modifications may be made in the details within the scope and range of equivalents of the claims and without departing from the invention. In the exemplary embodiment described above, the number of strips of an image and the number of luminance levels were assumed to be the same (4 for example). It will be understood, however, that these numbers may be different from each other. Furthermore, more than two MCU blocks may be selected for each luminance level and more than one estimate may be made for the noise level in each luminance level.

What is claimed:

1. A method for estimating noise levels in an image comprising the steps of:
   determining direct current (DC) values and alternating current (AC) values of discrete cosine transform (DCT) coefficients in each of selected data blocks of a coded image;
   classifying the selected data blocks into categories of luminance levels, based on the determined DC values;
   decoding the coded image into a decoded image;
   calculating a variance for each of the selected data blocks in the decoded image;
   ordering, based on intensity levels, the calculated variances into the categories of luminance levels; and
   selecting a calculated variance from each of the categories as a noise level for that category.

2. The method of claim 1 including the step of:
   storing block locations corresponding to each of the selected variances.

3. The method of claim 1 wherein receiving selected data blocks includes
   receiving a minimum coded unit (MCU) in a Joint Photographic Experts Group (JPEG) data stream, where each MCU includes luminance Y blocks, and color difference blocks of Cb and Cr.

4. The method of claim 1 wherein determining DC values of the DCT coefficients includes
   calculating an average DC value by averaging DC values of respective DCT coefficients in the Y blocks.

5. The method of claim 4 wherein determining AC values of the DCT coefficients includes
   calculating an average AC value by averaging AC values of respective DCT coefficients in the Y blocks and subtracting the calculated DC value.

6. The method of claim 5 wherein
   determining the DC and AC values of the DCT coefficients is based on each Y block having an 8×8 array of pixels.

7. The method of claim 6 further including the step of:
   storing locations of at least one Y block which has minimum average AC values.

8. The method of claim 1 wherein classifying the selected data blocks into categories includes
   dividing a range of luminance intensities into a plurality of luminance levels, and
   placing each of the selected data blocks into the plurality of luminance levels, based on a respective DC value of each of the selected data blocks.

9. The method of claim 8 wherein
   the range of luminance intensities varies between −1000 and +700, and
   the plurality of luminance levels is four levels fitted within the range of luminance intensities.

10. The method of claim 1 including the step of:
    storing locations of at least two selected data blocks, which are determined to have minimum average AC values, for each category of the luminance levels; and
    wherein the step of calculating the variance includes
    calculating the variance for each of the at least two selected data blocks for each category of the luminance levels.

11. The method of claim 1 including the steps of:
    dividing the coded image into a plurality of strips, and
    the steps of determining and classifying are performed for each strip of the plurality of strips.

12. The method of claim 1 including the step of:
    receiving selected data blocks including at least one Y block in every minimum coded unit (MCU) in a data stream, and
    selecting a calculated variance includes selecting one calculated variance for the received Y block for each category of luminance levels.

13. The method of claim 12 wherein receiving the selected data blocks includes
    receiving Cb and Cr blocks in every MCU in the data stream; and
    the method further includes the step of:
    estimating noise levels in the Cb and Cr blocks.

14. A method for estimating noise levels in a Joint Photographic Experts Group (JPEG) data stream comprising the steps of:
    receiving a minimum coded unit (MCU) of a JPEG data stream, including luminance Y blocks, and color difference blocks of Cb and Cr;
    determining direct current (DC) and alternating current (AC) values of discrete cosine transform (DCT) coefficients in the Y blocks;
    placing the determined DC values into a range of values, wherein the range includes a plurality of luminance levels;
    for each luminance level, selecting at least two blocks determined to have minimum AC values;
    for each luminance level, selecting one of the at least two blocks, based on order statistic filtering; and
    for each luminance level, outputting the selected one block.

15. The method of claim 14 wherein
    the determined DC and AC values are based on an 8×8 pixel array forming a block.

16. The method of claim 14 wherein
    the plurality of luminance levels includes at least four luminance levels.

17. The method of claim 14 including the step of:
    for each luminance level, outputting a noise level for the selected one block.

18. The method of claim 14 including the steps of:
    dividing an image into a plurality of strips, and
    repeating the steps of receiving, determining, placing, storing, selecting and outputting for each of the strips.

19. A system for estimating noise levels in a data stream comprising
    a first calculator for determining direct current (DC) and alternating current (AC) values of discrete cosine transform (DCT) coefficients in coded data blocks,
    a classifier for forming a plurality of luminance levels, based on the calculated DC values,
    a first selector for selecting at least two coded data blocks having minimum AC values provided by the first calculator, for each of the luminance levels,
    a second calculator for determining a variance for each of decoded data blocks corresponding to the selected coded data blocks, for each of the luminance levels,
    an order statistic filter for ordering the decoded data blocks based on the calculated variances, and
    a second selector for selecting one of the decoded data blocks, for each of the luminance levels.

20. The system of claim 19 including
    a block former coupled to the first calculator for dividing the data stream into multiple strips of an image and forming the coded data blocks for each of the multiple strips.

* * * * *